US009244291B2

(12) United States Patent
Nasu

(10) Patent No.: US 9,244,291 B2
(45) Date of Patent: Jan. 26, 2016

(54) METHOD OF DESIGNING COLORED LENS

(71) Applicant: KINEIDOU, Nagai-shi, Yamagata (JP)

(72) Inventor: Takeo Nasu, Nagai (JP)

(73) Assignee: Kineidou, Nagai-shi, Yamagata (JP)

( * ) Notice: Subject to any disclaimer, the term of this patent is extended or adjusted under 35 U.S.C. 154(b) by 0 days.

(21) Appl. No.: 14/626,087

(22) Filed: Feb. 19, 2015

(65) Prior Publication Data

US 2015/0268482 A1 Sep. 24, 2015

(30) Foreign Application Priority Data

Mar. 24, 2014 (JP) .................. 2014-059444

(51) Int. Cl.
*G02C 3/00* (2006.01)
*G02C 7/02* (2006.01)
*G02C 7/10* (2006.01)

(52) U.S. Cl.
CPC ............... *G02C 7/028* (2013.01); *G02C 7/021* (2013.01); *G02C 7/10* (2013.01)

(58) Field of Classification Search
CPC .......... G02C 7/046; G02C 7/021; G02C 7/04; G02C 7/10; G02C 7/02; G02C 7/061
USPC ............. 351/159.01, 159.02, 159.24, 159.29, 351/159.32, 159.66, 159.73, 159.74, 159.75
See application file for complete search history.

(56) References Cited

U.S. PATENT DOCUMENTS 3,877,797 A * 4/1975 Thornton, Jr. .................. 351/44
5,926,310 A 7/1999 Tamura et al.
7,931,369 B2 * 4/2011 Harris ...................... 351/159.64

FOREIGN PATENT DOCUMENTS

| JP | 08-179104 A | 7/1996 |
| JP | 10-133016 A | 5/1998 |
| JP | 2004-069905 A | 3/2004 |
| JP | 2008-547046 A | 12/2008 |
| JP | 2011-011970 A | 1/2011 |
| WO | 2007/001575 A1 | 1/2007 |

OTHER PUBLICATIONS

Japanese Patent Publication No. 5630795, Japanese Patent Application No. 2014-059444, Oct. 17, 2014, 8 pgs.
Notification of Reasons for Refusal with English concise explanation, Japanese Patent Application No. 2014-059444, May 27, 2014, 6 pgs.

(Continued)

*Primary Examiner* — James Greece
(74) *Attorney, Agent, or Firm* — Volpe and Koenig, P.C.

(57) ABSTRACT

To identify colors of objects as natural as those seen in naked eye view, it is provided a method of designing a colored lens specified by color coordinate values L, a, and b in a uniform color space, including: selecting a=+0.35 and b=+3.0 in L=87.4, a=−0.25 and b=+1.6 in L=74.2, and a=+1.5 and b=+3.35 in L=49.9 as target values in an a-b plane determined from the L-value, respectively; setting −4.3≤a≤+5 and −3≤b≤+9 in L=87.4, −3.5≤a≤+3 and −5≤b≤+8.2 in L=74.2, and −1.5≤a≤+4.5 and −0.5≤b≤+7.2 in L=49.9 as deviation ranges, respectively; forming an allowable range by connecting vertexes of the deviation ranges in L=87.4, L=74.2, and L=49.9 by second-order polynomial approximation curves in the uniform color space; and selecting the values L, a, and b of the colored lens so as to be included in the allowable range in the uniform color space.

3 Claims, 3 Drawing Sheets

(56) References Cited

OTHER PUBLICATIONS

Sugiyama, Sadao, "Study of sexual difference, generation difference and ethnicity difference in concept of basic color name," with English concise explanation, 1980, pp. 353-370.

Kurumisawa, Makoto, "Study of method for evaluating glass quality based on visual sense," with English concise explanation, 2001, pp. 13-29.

X-Rite Incorporated, "A Guide to Understanding Color Communication," 2007, pp. 1-24.

* cited by examiner

METHOD OF DESIGNING COLORED LENS

CLAIM OF PRIORITY

The present application claims priority from Japanese patent application JP 2014-59444 filed on Mar. 24, 2014, the content of which is hereby incorporated by reference into this application.

BACKGROUND OF THE INVENTION

This invention relates to a colored lens used for glasses or the like, and more particularly to, a method of designing a colored lens enabling a user thereof to identify the colors of objects as equally as in naked eye view.

A lens to be mounted on glasses and sunglasses is dyed with iodine or dye to be colored in order to protect pupils from sunlight or intense illumination.

Light that has passed through such a colored lens contains a large amount of colors of a colorant, thereby producing a different color from the one felt directly with the naked eye. Therefore, there is a problem in that it is difficult to recognize the color of the light that has passed through the colored lens as the same color as perceived with the naked eye. Specifically, there are problems, such as the inability to compare the maturity of a fruit with a color sample in a fruit farm, to distinguish between aquarium fish, or to identify colors when drawing a picture outside.

Meanwhile, according to JP H10-133016 A, there is disclosed a technology for providing a polarized lens enabling the user thereof to distinguish colors as positively as with the naked eye within the ranges of $22 \leq L \leq 70$, $-2.0 \leq a \leq 2.0$, and $-2.0 \leq b \leq 2.0$ in a uniform color space.

However, the related art specifies both an a-value and a b-value within the same rectangle for all kinds of L-values (brightness), which means that those values do not match actual conditions. Further, in the related art, the ranges of the a-value and the b-value are narrow, and hence in the case where a lens, which enables the user thereof to identify the colors of objects as equally as in naked eye view, is to be provided, it is difficult to realize the tint (light reflected by the lens, i.e., the color appearance of the lens) of the lens that satisfies the user's request for colors. Further, the polarized lens in the related art employs a polarizing film that is neither colorless nor transparent. Accordingly, the colored lens that does not have polarization characteristics and the polarized lens need different ideas to set a condition of colors for enabling the user thereof to identify the colors of objects as equally as in naked eye view.

Regarding a colored lens that does not have polarization characteristics, it is an object of this invention to provide a colored lens enabling the user thereof to identify the colors of objects as equally as in naked eye view.

SUMMARY OF THE INVENTION

A representative aspect of this invention is as follows. That is, there is provided a method of designing a colored lens specified by color coordinate values L, a, and b in a uniform color space, comprising: selecting $a=+0.35$ and $b=+3.0$ in $L=87.4$, $a=-0.25$ and $b=+1.6$ in $L=74.2$, and $a=+1.5$ and $b=+3.35$ in $L=49.9$ as target values in an a-b plane determined from the L-value, respectively; setting $-4.3 \leq a \leq +5$ and $-3 \leq b \leq +9$ in $L=87.4$, $-3.5 \leq a \leq +3$ and $-5 \leq b \leq +8.2$ in $L=74.2$, and $-1.5 \leq a \leq +4.5$ and $-0.5 \leq b \leq +7.2$ in $L=49.9$ as deviation ranges, respectively; forming an allowable range by connecting vertexes of the deviation ranges in $L=87.4$, $L=74.2$, and $L=49.9$ by second-order polynomial approximation curves in the uniform color space; and selecting the values L, a, and b of the colored lens so as to be included in the allowable range in the uniform color space.

According to one embodiment of this invention, the colored lens is colored within the above-mentioned range, and hence the colored lens can be provided that enables the user thereof not to identify erroneously the color of light that has passed through the colored lens, and through which the colors of objects look as natural as those seen in naked eye view. Further, regarding the colored lens that does not have polarization characteristics, the colored lens through which the colors of objects look natural can be provided in a wider range of the a-value and the b-value than in the related art.

BRIEF DESCRIPTION OF THE DRAWINGS

The present invention can be appreciated by the description which follows in conjunction with the following figures, wherein.

DETAILED DESCRIPTION OF THE PREFERRED EMBODIMENT

Figure 1:
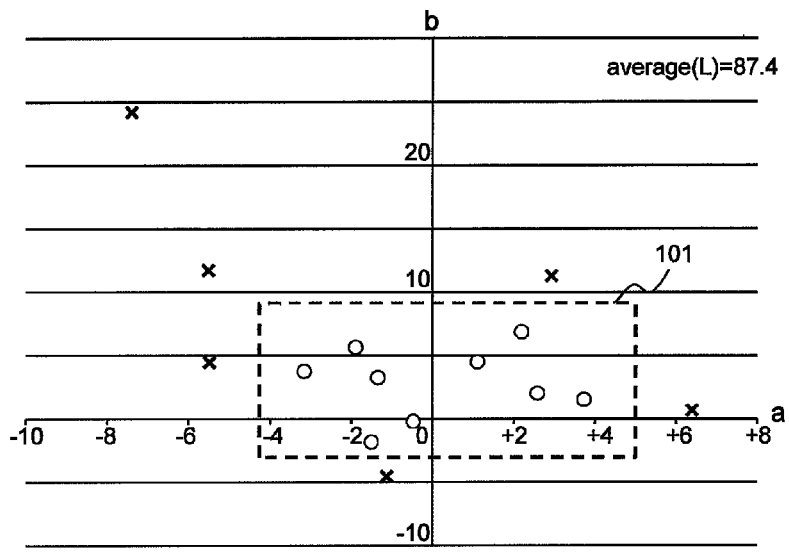
FIG. 1 is an experimental result showing whether the equal identification of colors as in naked eye view can be achieved for a colored lens having an L-value of 87.4 in a Lab space.

In the following, a description is given of methods for manufacturing and evaluating a colored lens according to one embodiment of this invention, and evaluation results thereof.

<Method of Manufacturing Colored Lens>

Iodine, direct dyes, reactive dyes, acidic dyes, or the like can be used as a colorant used for this embodiment.

Specifically, Kaya Las Supra Green GG, Kaya Las Supra Gray CGL, Sirius Scarlett B, Sirius Supra Brown G, Sumilight Black G, Sumilight Red 4B, Dia Luminous Blue GF, Direct Orange GK, Direct Fast Yellow R, Direct Fast Orange, Direct Fast Black D, Nippon Orange GG, or the like can be used as direct dyes. In addition, Diamira Yellow RTN, Diamira Brilliant Orange GD, Diamira Brilliant Violet 5R, Diamira Red B, Mikacion Yellow GRS, Mikacion Yellow RS, Mikacion Olive Green 3GS, Mikacion Scarlett GS, Mikacion Brilliant Blue RS, or the like can be used as reactive dyes. In addition, Kayakalan Yellow GL, Kayakalan Olive BGL, Kayakalan Orange RL, Kayanol M Yellow RW, Kayanol M Blue BW, Kayanol M Red BW, Sumitomo Fast Scarlett A, Sumilan Green BL, Daiwa Acid Orange I, Daiwa Acid Fast Blue NP, Brilliant Acid Blue R, Brilliant Scarlett 3R, or the like can be used as acidic dyes. A plastic lens is dyed with a desired color and a desired brightness (transmittance) by being immersed in a stain solution compounded of a plurality of selected those dyes for a predetermined time at a predetermined temperature, thereby manufacturing the colored lens.

Further, the lens according to this embodiment is formed of light transmissive resins. For example, thermoplastic resins such as cellulose diacetate, cellulose triacetate, cellulose acetate butyrate (CAB), cellulose propionate (CP), polycarbonate, methyl methacrylate (MMA), polyester, and polyolefin can be used. Alternatively, the lens may be formed of thermosetting resins. For example, diethylene glycol bisallyl carbonate, ethylene glycol diacrylate, a methacrylic acid ester, an acryl-styrol-urethane copolymer, and the like can be used as thermosetting resins.

Further, the colored lens according to this embodiment may be formed by molding a resin material mixed with stain that is compounded of a plurality of selected above-mentioned dyes. In this case, any one of the above-mentioned resin materials can be employed as the resin material for the molding.

Further, a light transmissive sheet and a lens may be integrated to form the colored lens. The sheet can be formed of a light transmissive resin. To achieve the integration of the sheet and the lens, a light transmissive adhesive may be used, or the sheet and the lens may be integrally molded by injection molding. In other words, at least one of the sheet and the adhesive can be colored to form the colored lens. In this case, the lens may be formed of the light transmissive resin or glass.

Further, the colored lens according to this embodiment may be formed by printing stain that is compounded of the plurality of selected above-mentioned dyes to transfer color on the surface of the above-mentioned resin material.

Further, the sheet or the lens may include a surface coating layer formed by vacuum vapor deposition, ion plating, colorant transfer, or other methods. In other words, the coating agent may be colored to form the colored lens. For example, hard coating, multi-coating, defogging coating, rain-proof coating, ultraviolet coating, infrared coating, hollow coating, or half coloring can be employed to form the surface coating layer.

<Method of Evaluating Colored Lens>

The spectral transmittance of the colored lens, which was manufactured as described above, was measured using a spectral transmittance meter, thereby determining color coordinate values L, a, and b in the uniform color space accordingly. It should be noted that the color coordinate value L in the uniform color space represents the brightness that is scaled from 0 to 100. The values L, a, and b are expressed respectively by tristimulus values X, Y, and Z in the CIE standard colorimetric system, namely, $L=100Y^{1/2}$, $a=175(1.02X-Y)Y^{-1/2}$, and $b=70(Y-0.847Z)Y^{-1/2}$.

Then, 45 kinds of the colored lens were created that had different colors and brightness. Then, 50 subjects to be examined saw color samples through those 45 kinds of the colored lens and judged whether each of the color samples looked natural. Specifically, those subjects to be examined judged "looks like a natural color" when he/she found that a color sample looked the same with the color sample seen without the colored lens, or judged "looks like an unnatural color" when he/she found that the color of the color sample was perceived but did not look the color (or looked like a different color). The color samples used in this evaluation were QPcard 201 manufactured by X-Rite, Inc (formerly Macbeth, AG). In addition, the 50 subjects to be examined consisted of males and females in their thirties to fifties.

<Evaluation Results of Colored Lens>

Next, a description is given of the evaluation results of the color identification of the colored lens.

Figure 2:
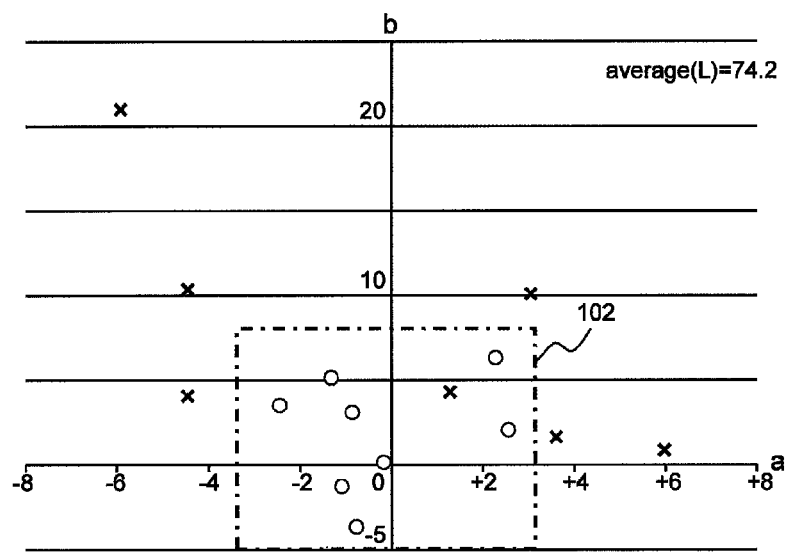
FIG. 2 is an experimental result showing whether the equal identification of colors as in naked eye view can be achieved for a colored lens having an L-value of 74.2 in the Lab space.
Figure 3:
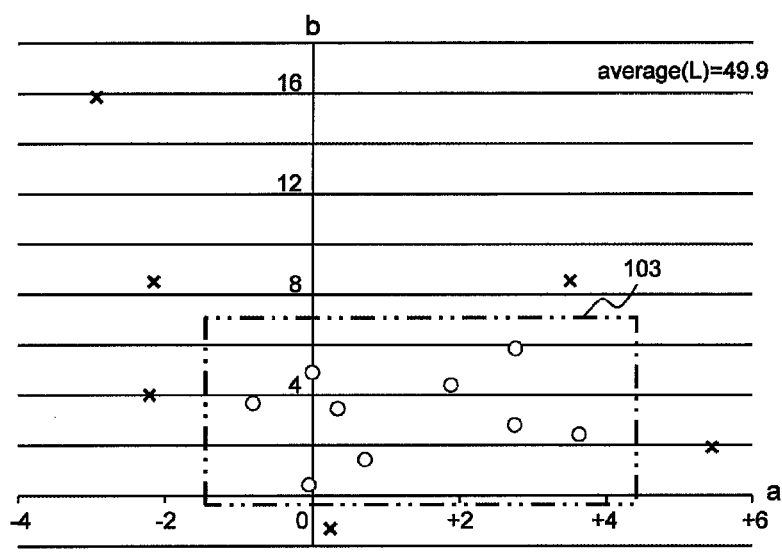
FIG. 3 is an experimental result showing whether the equal identification of colors as in naked eye view can be achieved for a colored lens having an L-value of 49.9 in the Lab space.

FIG. 1 to FIG. 3 show the experimental results to determine whether the identification of the colors of objects can be achieved as equally as in naked eye view for the colored lens in which the brightness in the Lab space changes. In FIG. 1 to FIG. 3, markers "O" represents the color for which more than or equal to 38 subjects to be examined (75%) judged "looks like a natural color" while "X" represents the color for which less than or equal to 37 subjects to be examined judged "looks like a natural color".

As shown in FIG. 1, the range 101 of the Lab space in which colors can be identified as equally as in naked eye view is understood to be $-4.3 \leq a \leq +5$ and $-3 \leq b \leq +9$ for the colored lens having the high brightness of L=82.64 to 90.78 (average value=87.4). As shown in FIG. 2, the range 102 of the Lab space in which colors can be identified as equally as in naked eye view is understood to be $-3.5 \leq a \leq +3$ and $-5 \leq b \leq +8.2$ for the colored lens having the brightness of L=70.05 to 77.09 (average value=74.2). Further, as shown in FIG. 3, the range 103 of the Lab space in which colors can be identified as equally as in naked eye view is understood to be $-1.5 \leq a \leq +4.5$ and $-0.5 \leq b \leq +7.2$ for the colored lens having the low brightness of L=46.95 to 52.04 (average value=49.9).

Figure 4A:
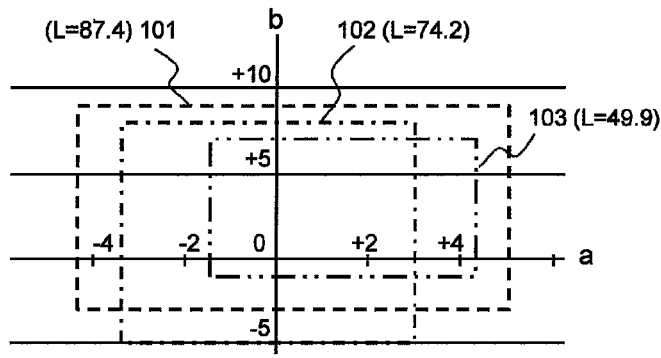
FIGS. 4A to 4C are explanatory diagrams showing a range in which the equal identification of colors as in naked eye view can be achieved.
Figure 4B:
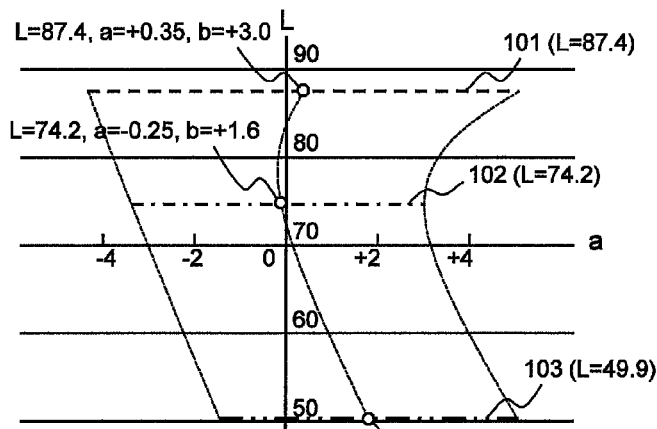
Figure 4C:
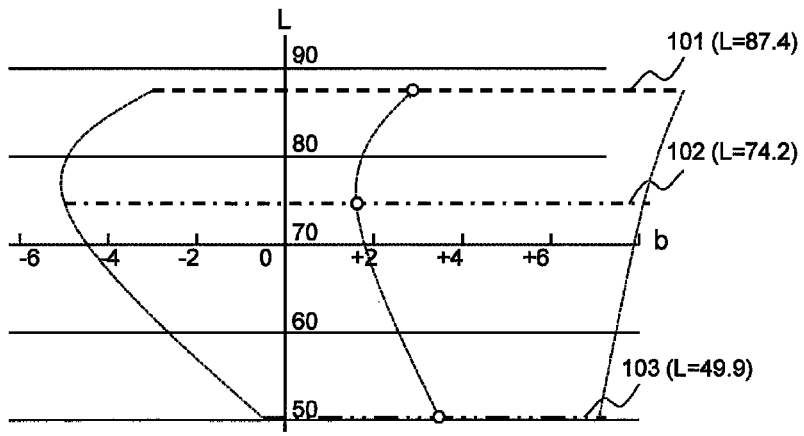

FIGS. 4A to 4C show the range derived from the above-mentioned experimental results in the Lab space, and FIG. 4A represents the a-b plane, FIG. 4B represents the a-L plane, and FIG. 4C represents the b-L plane. In each of FIGS. 4A to 4C, the vertexes of the rectangle shown in each of FIG. 1 to FIG. 3 are connected by second-order polynomial approximation curves to form an allowable range. It should be noted that the vertexes of the rectangle may be connected by another type of approximation curve (for example, linear approximation curve) or a straight line to form the allowable range. In other words, when a colored lens is included in the range shown in FIGS. 4A to 4C in the Lab space, the colored lens can be provided as the lens by which a large number of users thereof conclude that they can see the natural colors of objects.

Specifically, a=+0.35 and b=+3.0 are the target values in L=87.4, and the a-value and the b-value are set to be included in the ranges of $-4.3 \leq a \leq +5$ and $-3 \leq b \leq +9$, respectively. Further, a=-0.25 and b=+1.6 are the target values in L=74.2, and the a-value and the b-value are set to be included in the ranges of $-3.5 \leq a \leq +3$ and $-5 \leq b \leq +8.2$, respectively. Further, a=+1.5 and b=+3.35 are the target values in L=49.9, and the a-value and the b-value are set to be included in the ranges of $-1.5 \leq a \leq +4.5$ and $-0.5 \leq b \leq +7.2$, respectively. FIGS. 4A to 4C also show the target value curves formed by connecting the above-mentioned target values by the second-order polynomial approximation curves.

As described above, according to one embodiment of this invention, there can be provided a colored lens by which a large number of users thereof conclude that they can see the colors of objects as equally as in naked eye view without erroneously identifying the colors of the light that has passed through the colored lens. Further, the allowable range in the Lab space determined in this invention is wider than that of the related art, and hence the lens can be provided through which the colors of objects look natural while at the same time having the color appearance (the color of the light reflected by the lens is not only gray but also has some tint) requested by the user.

In other words, sense is very important to humans, and the colored lens according to this embodiment can reduce glare while maintaining visual sense and other sense felt by humans at the similar condition to those of the naked eye. To put it another way, among other lenses for glasses or sunglasses, the lens can be provided that produces less strange feelings and through which the visual sense is the closest to that of humans. Therefore, it can be said that the lens reduces glare felt by humans and does not disrupt the human sense.

Further, according to the colored lens of this embodiment, the colors of objects look as natural as those seen in naked eye view, and hence senses of distance and size of objects can be perceived correctly. Generally, the senses of distance and size change depending on the perceived color, and an object having a warm color (for example, red) is perceived bigger than its actual size while an object having a cold color (for example, blue) is perceived smaller. Therefore, the senses of distance and size of objects are perceived correctly through the colored lens according to this embodiment. More specifically, there is a case where lines are to be read by looking at the reflection of turf in a golf course, but the reflected light of the turf does not pass through the polarized lens. In this case, it is difficult to obtain the correct sense of distance. Therefore, other than the polarized lens, regarding the colored lens that does not have polarization characteristics, it is meaningful to develop the lens through which the colors of objects look as natural as those seen in naked eye view. Further, the polarized lens, which does not pass through particular polarized light, causes unseen objects in driving a vehicle. The colored lens according to this embodiment can avoid such a dangerous situation.

In addition to lenses that always retain the same color, the colored lens described above in this embodiment can also be applied to a photochromatic lens changing its color depth in accordance with the brightness of a surrounding environment. For example, although the photochromatic lens is clear in darkness, it is satisfactory for the color of the photochromatic lens to be included in the above-mentioned range in the Lab space when exposed to a lot of ultraviolet rays. For example, the photochromatic lens included in the range of the Lab space according to this invention can be obtained by using a dye that contains silver halide to have a light control function.

While the present invention has been described in detail and pictorially in the accompanying drawings, the present invention is not limited to such detail but covers various obvious modifications and equivalent arrangements, which fall within the purview of the appended claims.

The representative aspects of this invention other than the one described in the appended claim are as follows.

1. A colored lens, in which color coordinate values L, a, and b in the uniform color space are within a range of space formed by connecting vertexes of rectangles shown in the following (1), (2), and (3).
(1) In L=87.4, $-4.3 \leq a \leq +5$ and $-3 \leq b \leq +9$
(2) In L=74.2, $-3.5 \leq a \leq +3$ and $-5 \leq b \leq +8.2$
(3) In L=49.9, $-1.5 \leq a \leq +4.5$ and $-0.5 \leq b \leq +7.2$ 2. A method of designing a colored lens specified by color coordinate values L, a, and b in a uniform color space, including:

selecting a predetermined a-value and a predetermined b-value in an a-b plane determined from the L-value as target values, and determining the L-value, the a-value, and the b-value within a predetermined deviation range from the target values, the target values being a=+0.35 and b=+3.0 in L=87.4, a=−0.25 and b=+1.6 in L=74.2, and a=+1.5 and b=+3.35 in L=49.9, the deviation range being $-4.3 \leq a \leq +5$ and $-3 \leq b \leq +9$ in L=87.4, $-3.5 \leq a \leq +3$ and $-5 \leq b \leq +8.2$ in L=74.2, and $-1.5 \leq a \leq +4.5$ and $-0.5 \leq b \leq +7.2$ in L=49.9.

What is claimed is:

1. A method of selecting a brightness L-value, color coordinate a value, and color coordinate b value for a colored lens in lab color space, comprising:

choosing a=+0.35 and b=+3.0 in L=87.4, a=−0.25 and b=+1.6 in L=74.2, and a=+1.5 and b=+3.35 in L=49.9 as target values in an a-b plane determined from the L-value, respectively;

forming a first deviation range by setting $-4.3 \leq a \leq +5$ and $-3 \leq b \leq +9$ in L=87.4, forming a second deviation range by setting $-3.5 \leq a \leq +3$ and $-5 \leq b \leq +8.2$ in L=74.2, and forming a third deviation range by setting $-1.5 \leq a \leq +4.5$ and $-0.5 \leq b \leq +7.2$ in L=49.9;

forming an allowable range of color coordinate a values in the a-L plane bounded by:

a lower color coordinate a value boundary formed by fitting a second-order polynomial approximation curve to the lowermost color coordinate a values for the first, second and third deviation ranges, an upper color coordinate a value boundary formed by fitting another second order polynomial approximate curve to the uppermost color coordinate a values for the first, second and third deviation ranges;

forming an allowable range of color coordinate b values in the b-L plane bounded by:

a lower color coordinate b value boundary formed by fitting a second-order polynomial approximation curve to the lowermost color coordinate b values for the first, second and third deviation ranges, an upper color coordinate b value boundary formed by fitting another second order polynomial approximate curve to the uppermost color coordinate b values for the first, second and third deviation ranges; and selecting the L-value, color coordinate a, and color coordinate b of the colored lens so as to be included in the allowable range of a values and the allowable range of b values in the lab color space.

2. The method of claim 1, wherein the allowable range of color coordinate a values in the a-L plane is further bounded by a lower L-value boundary equal to about 49.9, and an upper L-value boundary equal to about 87.4.

3. The method of claim 1, wherein the allowable range of color coordinate a values in the b-L plane is further bounded by a lower L-value boundary equal to about 49.9, and an upper L-value boundary equal to about 87.4.

* * * * *